(12) United States Patent
Bucher et al.

(10) Patent No.: US 11,870,351 B2
(45) Date of Patent: Jan. 9, 2024

(54) POWER CONVERTER, VEHICLE AND METHOD OF OPERATING A POWER CONVERTER

(71) Applicant: Valeo Siemens eAutomotive Germany GmbH, Erlangen (DE)

(72) Inventors: Alexander Bucher, Nuremberg (DE); Alexander Pawellek, Erlangen (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 354 days.

(21) Appl. No.: 17/276,921

(22) PCT Filed: Sep. 20, 2019

(86) PCT No.: PCT/EP2019/075308
§ 371 (c)(1),
(2) Date: Mar. 17, 2021

(87) PCT Pub. No.: WO2020/064539
PCT Pub. Date: Apr. 2, 2020

(65) Prior Publication Data
US 2021/0359608 A1 Nov. 18, 2021

(30) Foreign Application Priority Data
Sep. 28, 2018 (DE) ..................... 10 2018 124 094.5

(51) Int. Cl.
*H02M 3/335* (2006.01)
*B60L 50/50* (2019.01)
(52) U.S. Cl.
CPC ......... *H02M 3/33523* (2013.01); *B60L 50/50* (2019.02)
(58) Field of Classification Search
CPC .................................................. H02M 3/33523
See application file for complete search history.

(56) References Cited

U.S. PATENT DOCUMENTS

| 4,800,338 A | 1/1989 | Yoshizawa et al. |
| 5,438,496 A | 8/1995 | Meur et al. |

(Continued)

FOREIGN PATENT DOCUMENTS

| DE | 4407529 C1 | 6/1995 |
| DE | 69308343 T2 | 6/1997 |

(Continued)

OTHER PUBLICATIONS

PCT/ISA/210, "International Search Report for International Application No. PCT/EP2019/075308," dated Dec. 3, 2019.

*Primary Examiner* — Kyle J Moody
(74) *Attorney, Agent, or Firm* — Manabu Kanesaka

(57) ABSTRACT

A power converter having a primary side and a secondary side galvanically isolated therefrom, includes a secondary-side functional unit operable in dependence on auxiliary information generated on the primary side, a primary-side voltage supply device arranged to provide a supply voltage, a power transmission device, which has a switching unit for switching the supply voltage and a transmission unit, which is set up to transmit the switched supply voltage to the secondary side, to convert the supply voltage into an operating voltage for the functional unit, a primary-side modulation device to provide a clock signal to the switching unit and to vary a frequency of the clock signal by the auxiliary information, and a secondary-side demodulation device arranged to generate at least one use signal representing the auxiliary information from a secondary voltage provided by the transmitter unit and to provide a use signal to the functional unit.

14 Claims, 7 Drawing Sheets

(56) References Cited

U.S. PATENT DOCUMENTS

| | | | |
|---|---|---|---|
| 10,186,896 B2* | 1/2019 | Klesyk | H02J 7/00714 |
| 10,291,144 B2* | 5/2019 | Sawada | H01L 25/115 |
| 2009/0147544 A1 | 6/2009 | Melanson | |
| 2010/0013322 A1 | 1/2010 | Sogabe et al. | |
| 2010/0259098 A1 | 10/2010 | Huang et al. | |
| 2012/0051101 A1 | 3/2012 | El-Barbari et al. | |
| 2016/0380563 A1 | 12/2016 | Fukuta | |
| 2018/0115309 A1 | 4/2018 | Nicholls | |

FOREIGN PATENT DOCUMENTS

| | | |
|---|---|---|
| EP | 0251239 A2 | 1/1988 |
| EP | 2302798 A1 | 3/2011 |
| EP | 3076550 A1 | 10/2016 |
| JP | 2008-295191 A | 12/2008 |

* cited by examiner

POWER CONVERTER, VEHICLE AND METHOD OF OPERATING A POWER CONVERTER

RELATED APPLICATIONS

The present application is National Phase of International Application No. PCT/EP2019/075308 filed Sep. 20, 2019, and claims priority from German Application No. DE 10 2018 124 094.5 filed Sep. 28, 2018, the disclosure of which is hereby incorporated by reference herein in its entirety.

BACKGROUND OF THE INVENTION

The present invention relates to a power converter having a primary side and a secondary side galvanically isolated therefrom, comprising a secondary-side functional unit operable in response to auxiliary information generated on the primary side, a primary-side voltage supply device arranged to provide a supply voltage, and a power transmission device having a switching unit for switching the supply voltage and a transmission unit arranged to transmit the switched supply voltage to the secondary side to convert the supply voltage into an operating voltage for the functional unit.

In addition, the invention relates to a vehicle and a method of operating a power converter.

Especially in the field of vehicle drive technology, power converters are separated into a primary side, which typically realizes control tasks at a low voltage level, and a secondary side, which realizes a conversion of the current type and its characteristic parameters by means of power electronics. This galvanic isolation represents an isolation barrier which serves, on the one hand, to ensure the electrical safety of the converter, in particular the protection of persons when used in an IT system (Isolé Terre), and, on the other hand, a functional division when the primary side and the secondary side are operated at different, sometimes changing, potentials.

The secondary side also usually has a functional unit, such as a driver device for the power electronics, whose operating voltage is converted from a supply voltage on the primary side by means of a power transmission device. In order to realize the galvanic isolation also for the functional unit, the power transmission device has a transmission unit which realizes the galvanic isolation. The functional unit can be operated as a function of auxiliary information which is generated on the primary side and is to be transmitted via the isolation barrier. It is known to transmit such auxiliary information from the primary side to the secondary side via inductive coupling, micro-transformers designed as integrated circuits, or optically via optocouplers. Alternatively, the galvanic isolation can be realized capacitively, piezo-electronically or acoustically.

However, such transmission devices for the auxiliary information cause additional component effort and entail additional area and placement effort on a printed circuit board, which in turn causes higher costs of the power converter. Each additional transmission device also increases the total effective coupling capacitance between the primary and secondary sides, which has a negative effect on the electromagnetic compatibility of the converter.

The invention is therefore based on the task of providing an improved, in particular less costly and/or more electromagnetically compatible, method of transmitting auxiliary information from a primary side to a secondary side of a converter.

SUMMARY OF THE INVENTION

To solve this problem, a power converter of the type mentioned above is proposed according to the invention, further comprising a primary-side modulation device which is arranged to provide a clock signal for the switching unit and to change a frequency of the clock signal in dependence on the auxiliary information, and a secondary-side demodulation device which is arranged to generate at least one use signal representing the auxiliary information from a secondary voltage provided by the transmission unit and to provide a use signal to the functional unit.

The invention is based on the idea of using the transmission unit of the power transmission device not only for power transmission but also for transmitting auxiliary information from the primary side to the secondary side. In other words, the power transmission and the information transmission are integrated into the transmission unit, which implements an isolation barrier between the primary side and the secondary side, at least in sections. For this purpose, a modulation device is first provided on the primary side, which realizes a frequency modulation of the clock signal for the switching unit depending on the auxiliary information. The switched supply voltage and the auxiliary information modulated onto it can then be transmitted together by means of the transmission unit from the primary side to the secondary side, where the demodulation device can recover the auxiliary information in the form of one or more use signals.

Advantageously, additional transmission devices for transmitting the auxiliary information can thus be dispensed with because the power transmission device is also used for transmitting the auxiliary information. As a result, the power converter is realized in a much more space-saving manner, since the saved transmission devices would have to fulfill additional clearance and creepage distance requirements, which are, however, already fulfilled by the transmission unit. Likewise, improved electromagnetic compatibility is achieved, since an increase in a coupling capacitance between the primary side and the secondary side due to the additional transmission device is eliminated.

The converter according to the invention preferably realizes a rated insulation voltage of at least 1 kV, preferably at least 2 kV, particularly preferably at least 3 kV, very especially preferably at least 4 kV by means of the galvanic isolation. Typically, only primary-side components of the converter and only secondary-side components of the converter are spatially separated from each other, in particular spaced apart from each other in such a way that required distances to maintain creepage distances along non-conductive surfaces are maintained. A space between the components is typically filled with a medium of sufficiently high dielectric strength, including air.

The modulation device typically comprises a signal generator unit, by means of which a carrier signal can be provided, and a modulator unit, by means of which the carrier signal can be modulated by a signal describing the auxiliary information and the clock signal can be provided. The modulation device also includes a coding unit by means of which information states of the auxiliary information are assigned signal states represented by a coded signal. The transmission unit is typically followed on the secondary side by a rectifier unit and/or a smoothing unit.

The secondary voltage can be tapped between a secondary coil of the transmitter unit and the rectifier unit and made available to an input of the demodulation device. The supply voltage and the operating voltage are typically DC voltages.

It is preferred in the converter according to the invention that the modulation device is arranged to change the frequency of the clock signal within a frequency interval in which a voltage transformation ratio with respect to input and output voltage of the power transmission device is substantially frequency invariant. In this way, it can be avoided that the secondary voltage and thus also the operating voltage for the functional unit changes significantly due to the modulated clock signal. In this context, the term "essentially frequency-invariant" means that the operating voltages produced by modulation with any pair of information states differ by no more than 20%, preferably no more than 10%, particularly preferably no more than 5%.

In the converter according to the invention, the power transmission device can have a hard-switching topology. An example of such a power transmission device is a flyback converter. Here, it is particularly preferred that the modulation device is arranged to provide the clock signal in such a way that the power transmission device is operated in a continuous operating mode. Suitably, the power transmission device is also arranged to be operated in a continuous mode of operation at frequencies of the clock signal provided by the modulation device. In fact, in the continuous operating mode, the modulation has no appreciable influence on a voltage translation ratio with respect to input and output voltages of the power transmission device.

Alternatively, the power transmission device of the converter according to the invention may be of the last resonant type. A typical representative of such a power transmission device is an LLC converter. In order to achieve here a frequency-invariant voltage transformation ratio with respect to input and output voltage, it is expedient if the modulation device is set up to preset the frequency of the clock signal in such a way that it is at least 0.2 times, preferably 0.6 times, particularly preferably 0.8 times, most preferably 1.0 times the normalized switching frequency of the power transmission device. The normalized switching frequency corresponds to the ratio of the frequency of the clock signal to the primary-side resonant frequency of the power transmission device.

With regard to the demodulation device of the converter according to the invention, it is preferred if this has a monoflop unit whose hold time is shorter than the shortest period of the clock signal, to which an information state of the auxiliary information is assigned, and which is set up to provide a pulse-modulated use signal. The demodulation device can thus be implemented with little circuitry, for example by a timer component (NE555) or a discrete transistor circuit. At typical frequencies of the clock signal, six, eight, twelve or more information states can certainly be transmitted when using the monoflop unit.

Advantageously, it can also be provided that the demodulation device has a low-pass unit which is connected downstream of the monoflop unit and is set up to provide an analog use signal from the pulse-modulated use signal. Thus, a substantially linear relationship between the frequency of the clock signal and the voltage of the analog use signal can be achieved. The low-pass unit may be an RC element or other averaging filter.

Alternatively or additionally, the converter according to the invention can be provided with a demodulation device comprising a PLL unit which is set up to provide an analog use signal. The PLL unit (phase-locked loop) enables the transmission of a wide range of values of information states of the auxiliary information, since even small frequency changes lead to a relatively high change in the voltage of the use signal. On the one hand, this higher sensitivity minimizes the required frequency variation on the part of the modulation device and, on the other hand, eliminates the averaging described above. In addition, a low transmission time is realized compared to the monoflop unit. Moreover, the PLL unit can be realized by standardized integrated circuits, since the requirements on the quality of the PLL unit are low for the typical operating scenarios of the converter according to the invention. Thus, a comparatively cost- and space-saving implementation of the PLL unit can be achieved. The PLL unit is conveniently set up to provide an input signal of a voltage-controlled oscillator of the PLL unit as an analog use signal.

In addition, the demodulation device can have an analog-to-digital converter unit that is set up to convert the analog use signal into a digital use signal. This allows further processing of the use signal or the auxiliary information on the secondary side.

In a further expedient embodiment of the converter according to the invention, the demodulation device has a filter unit with at least one filter element whose frequency response is selected in such a way that the filter element is operated in a stop band or a pass band at a frequency specified by the modulation device. Expediently, at least n−1 filter elements are provided for n possible information states of the auxiliary information. Furthermore, the filter unit may be followed by a decision unit providing the use signal. The filter elements can be passive filter elements, which enables a simple implementation in terms of circuitry. In order to enable reliable detection of the information states, in particular at small intervals between intended clock frequencies, the filter elements can be active filter elements which have a steeper frequency response. The filter elements may have a high-pass characteristic, a low-pass characteristic, a band-pass characteristic, or a band-stop characteristic. In particular, the filter elements may be notch filters.

The converter according to the invention typically has a secondary-side power unit with at least one power switching element, which can be controlled as a function of drive signals generated on the primary side. The power switching element is typically a semiconductor power switching element, in particular an IGBT or a power MOSFET. It is expedient for the power converter to have a control device on the primary side, which is designed to generate the drive signals and/or the auxiliary information as a function of operating parameters of the power converter.

According to a particularly preferred embodiment, the functional unit is a driver device which is set up to drive the at least one power switching element as a function of the drive signals. The driver device can in particular comprise a driver unit for each power switching element, which is set up to drive a power switching element.

It is particularly preferred that the driver device has a resistor unit connected upstream of a control input of a power switching element, the resistance value of which can be changed by the use signal. Alternatively, the driver device can have a drive unit with current source characteristics connected upstream of a control input of a power switching element, the current value and/or current profile of which can be changed by the use signal. In this way, the auxiliary information can be used to specify a switching speed of the power switching elements.

Advantageously, the converter also has a transmission device which at least partially galvanically isolates the primary side and the secondary side and via which the control signals can be transmitted to the secondary side. It is therefore proposed to provide a dedicated transmission device for the transmission of the control signals. This allows a particularly simple retrofitting of conventional converters, since the integration of the auxiliary information transmission and the power transmission does not affect the transmission of the control signals, which typically has to meet higher safety requirements.

In addition, it can be provided that the converter according to the invention is designed as an inverter and the power unit is set up for secondary-side conversion of an input DC voltage into an output AC voltage. Alternatively, the converter according to the invention can be designed as a DC/DC converter and the power unit can be set up for secondary-side conversion of a DC input voltage into a DC output voltage. The auxiliary information transfer according to the invention can thus be implemented in a wide range of converter types. As a further alternative, it is possible for the converter to be designed as an active rectifier and for the power unit to be set up to convert an input AC voltage into an output DC voltage.

In addition, the invention relates to a vehicle comprising a power converter according to the invention. When the power converter is designed as an inverter, the power converter may be arranged for converting, for example, a DC input voltage provided by a high-voltage source into an AC voltage provided for supplying the electric machine. For example, the power converter may supply an electric machine for driving the vehicle. If the power converter is a DC-DC converter or an active rectifier, it may be arranged, for example, as a charging device for charging a vehicle battery. The vehicle may be a land vehicle, in particular a passenger car or truck, or a water vehicle or an aircraft.

The present invention also relates to a method for operating a power converter having a primary side and a secondary side which is electrically isolated therefrom, comprising a secondary-side functional unit which is operated as a function of auxiliary information generated on the primary side, a primary-side voltage supply device which provides a supply voltage, and a power transmission device which has a switching unit for switching the supply voltage and a transmission unit which transmits the switched supply voltage to the secondary side in order to convert the supply voltage into an operating voltage for the functional unit, comprising the following steps: Primary-side provision of a clock signal for the switching unit, the frequency of which is changed on the primary side as a function of the auxiliary information; secondary-side generation of at least one use signal representing the auxiliary information from a secondary voltage provided by the transmission unit; and secondary-side provision of a use signal to the functional unit.

All the explanations concerning the converter according to the invention can be applied analogously to the vehicle according to the invention and the process according to the invention, so that the advantages mentioned above can also be achieved with these.

Further advantages and details of the invention will be apparent from the embodiments described below and from the drawings. These are schematic representations and show:

DETAILED DESCRIPTION OF THE INVENTION

Figure 1:
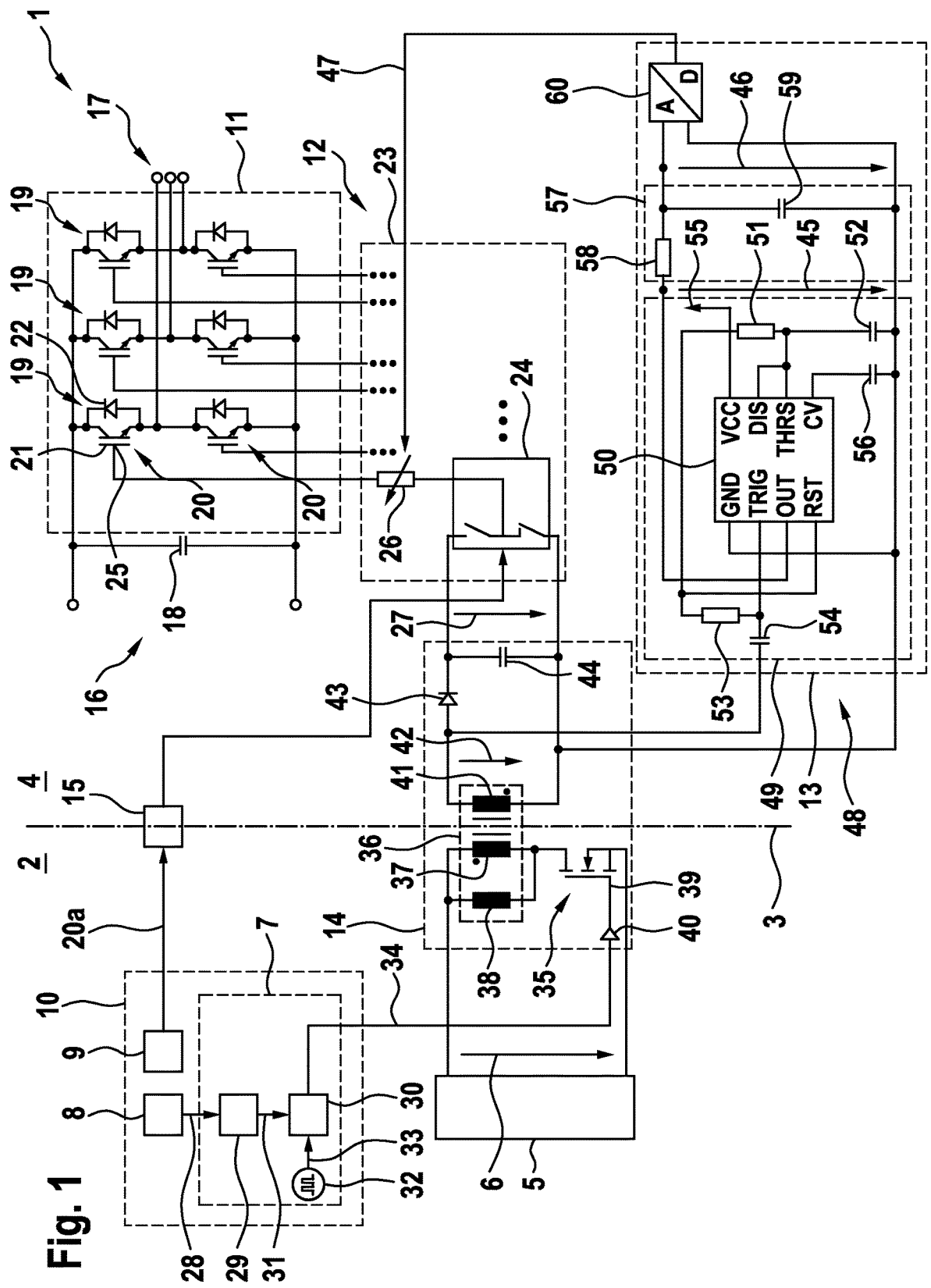
FIG. 1 A circuit diagram of an embodiment of the converter according to the invention.

FIG. 1 is a circuit diagram of an embodiment of a power converter 1 with a primary side 2 and a secondary side 4 separated therefrom by an insulation barrier 3.

On the primary side, the converter 1 comprises a voltage supply device 5, which is set up to provide a supply voltage 6, a modulation device 7, and two control units 8, 9. In this embodiment, the modulation device 7 and the control units 8, 9 are implemented in a control device 10 realized by a microcontroller. On the secondary side, the converter 1 has a power unit 11, a functional unit 12 and a demodulation device 13. The isolation barrier 3 is implemented by a power transmission device 14 as well as by a transmission device 15, for example in the form of an optocoupler or an inductive transformer. Consequently, the power transmission device 14 and the transmission device 15 can be assigned to both the primary side 2 and the secondary side 4.

In the present embodiment, the power converter 1 is designed as an inverter, so that the power unit 11 is set up for secondary-side conversion of an input DC voltage at an input 16 of the power converter 1 into an output AC voltage at an output 17 of the power converter 1. Between the input 16 and the power unit 11, the power converter 1 has a DC link capacitor 18. The power unit 11 comprises a plurality of power switching elements 20 connected to form half-bridges 19, each of which comprises an IGBT 21 with a diode 22 connected in parallel or a power MOSFET.

To drive a respective power switching element 20, the second control unit 9 is set up to generate drive signals 20a which are transmitted to the secondary side via the transmission device 15 and amplified there by means of a driver device 23 to suitable switching voltage levels for switching the power switching elements 20.

The driver device 23, which in the present case forms the functional unit 12, comprises for each power switching element 20 a driver unit 24 in the form of a push-pull output stage and a resistor unit 26, whose resistance value can be varied, connected between a control input 25 of a respective power switching element 20 and the driver unit 24. By means of the variable resistance value, a switching speed of the power switching element 20 can be adjusted. To supply the functional unit 12 or the driving device 23 with an operating voltage 27, the driving device 23 is connected to the power transmission device 14 on the secondary side. This consequently provides the aforementioned switching voltage levels electrically isolated from the primary side 2 as a converted supply voltage 6.

The resistance value of the resistor unit 26 is set by means of auxiliary information 28, which can assume two or more information states and is determined by means of the first control unit 8 on the primary side as a function of operating parameters of the converter 1. For the transmission of the auxiliary information 28 from the primary side 2 to the secondary side 4, a further transmission device analogous to the transmission device 12 for the control signals is dispensed with. Instead, the auxiliary information 28, which can assume several information states, is frequency-modulated by means of the modulation device 7, transmitted across the insulation barrier 3 by means of the power transmission device 14 and recovered on the secondary side by means of the demodulation device 13.

The modulation device 7 has an encoding unit 29 which encodes the information states and provides a modulation unit 30 with an encoded signal 31 representing the auxiliary information 28. Depending on the coded signal 31, the modulation unit 30 frequency-modulates a carrier signal 33 provided by a signal generator unit 32. On the output side, the modulation unit 30 provides a clock signal 34 which can be made available to the power transmission device 14.

The power transmission device 14 is designed as a flyback converter and comprises a switching unit 35 and an inductive transmission unit 36, which inductively couples the primary side 2 and the secondary side 4 in sections. On the primary side of the power transmission device 14, a main inductance 38 is modeled in parallel with a primary winding 37 of the transmission unit 36. The switching unit 35 receives at its control input 39 the clock signal 34 amplified by means of a driver 40. The modulation device 7 is set up in such a way that the clock signal 34 causes continuous operation of the power transmission device 14. As a result, a secondary voltage 42 dropping across a secondary winding 41 of the transmission unit 36 is essentially independent of the frequency of the clock signal 34, which varies as a result of the modulation. On the secondary side, the power transmission device 14 also has a rectifier unit 43 in the form of a diode and a smoothing unit 44 in the form of a capacitor, which smoothes the rectified secondary voltage 42 and thus provides the operating voltage 27 for the functional unit 12 or the driver device 23.

The secondary-side demodulation device 13 is arranged to generate use signals 45, 46, 47, each representing the auxiliary information. For this purpose, an input 48 of the demodulation device 13 is connected to the power transmission device 14 so that the secondary voltage 42 is applied to the input 48.

The demodulation device 13 comprises a demodulation unit in the form of a monoflop unit 49 which receives the secondary voltage 42 as an input signal. In the present embodiment, the monoflop unit 49 is formed by a wired timer element 50 in the form of an integrated NE555 device. The monoflop unit 49 is thereby configured such that its hold time is less than the shortest period of the clock signal 34 to which an information state of the auxiliary information 28 is assigned. Here, the hold time is obtained by connecting a threshold terminal THRS of the timer element 50 to an RC element formed of a resistor 51 and a capacitor 52 according to the formula $$t_{on}=\ln(3)\cdot R\cdot C,$$

where $t_{on}$ is the hold time, the operator $\ln(\cdot)$ is the natural logarithm, R is the resistance value of the resistor 51 and C is the capacitance of the capacitor 52.

The VCC terminal of the timer element 50 is connected to an operating voltage 55, which may correspond to the operating voltage 27. An additional RC element consisting of a resistor 53 and a capacitor 54 connected to a trigger terminal TRIG forms a high-pass filter and differentiates the secondary voltage 42 into needle pulses. In addition, a control terminal CV of the timer element 50 is connected to another capacitor 56 connected to ground to prevent oscillation of the timer element 50. The monoflop unit 49 thus generates a square-wave pulse of the duration of the hold time at each rising falling edge of the secondary voltage 42—and correspondingly at each rising edge of the clock signal 34, with time intervals between two square-wave pulses depending on the period duration of the clock signal 34 and thus on the auxiliary information 28. Consequently, the pulse-modulated use signal 45 can be tapped at an output terminal OUT of the timer element 50.

The demodulation device 13 further comprises a low-pass unit 57 connected downstream of the demodulation device 49, which in the present case is formed by an RC element having a resistor 58 and a capacitor 59. The low-pass unit smoothes the pulse-modulated use signal 45 and uses it to provide the analog use signal 46 whose voltage corresponds to a respective information state of the auxiliary information 28.

In addition, the demodulation device 13 comprises an analog-to-digital conversion unit 60 which is connected downstream of the low-pass unit 57 and converts the analog use signal 46 into the digital use signal 47. Consequently, the digital use signal 47 represents the auxiliary information 28 and is used for setting the resistor unit 26 of the driver device 23. Consequently, the auxiliary information 28 can be transmitted from the primary side 2 to the secondary side 4 by means of the transmission unit 36 without an additional transmission device.

Figure 2:
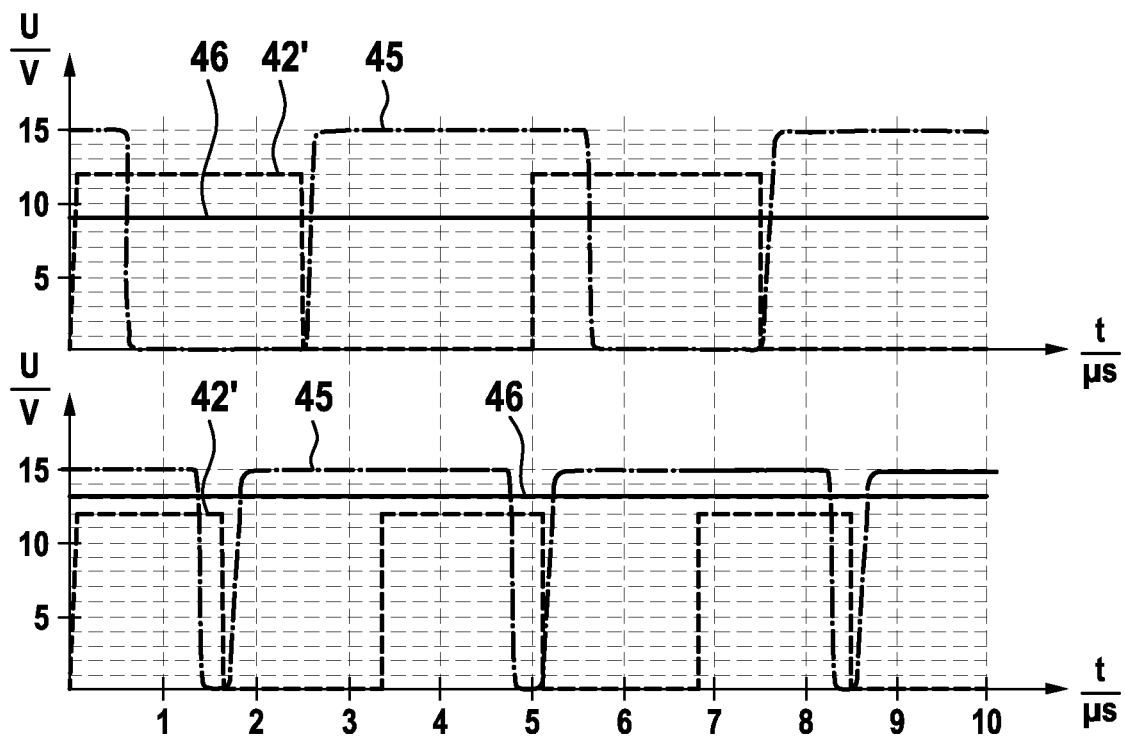
FIG. 2 diagrams of an image of a secondary voltage and of use signals over time during operation of the converter shown in FIG. 1.

FIG. 2 shows curves of an image 42' of the secondary voltage 42, the pulse-modulated use signal 45 and the analog use signal 46 over time t, where the curves shown in the upper diagram refer to a clock signal 34 with a frequency of 200 kHz and the lower curves refer to a clock signal 34 with a frequency of 300 kHz.

The waveforms of the use signals 45, 46 are further based on a configuration of the demodulation device 13 shown in FIG. 1, in which the resistance value of the resistor 51 is 27 kΩ and the capacitance value of the capacitor 52 is 100 pF, resulting in a hold time of approximately 3.0 µs according to the aforementioned formula. The resistance value of resistor 53 is 4.7 kΩ, the capacitance value of capacitor 54 is 10 pF, and the capacitance value of capacitor 56 is 10 nF. In the low-pass unit 57, the resistor 58 has a resistance value of 160 kΩ and the capacitor 59 has a capacitance value of 1 nF, resulting in a cutoff frequency of the RC element of about 0.995 kHz. The operating voltage 55 is 15 V. Obviously, the pulse-modulated use signal 45 thus becomes a sufficiently constant analog use signal 46, which is about 9 V at a frequency of the clock signal 34 of 200 kHz and about 13 V at a frequency of the clock signal 34 of 300 kHz. Obviously, the monoflop unit 49 uses a falling edge as a trigger.

Figure 3:
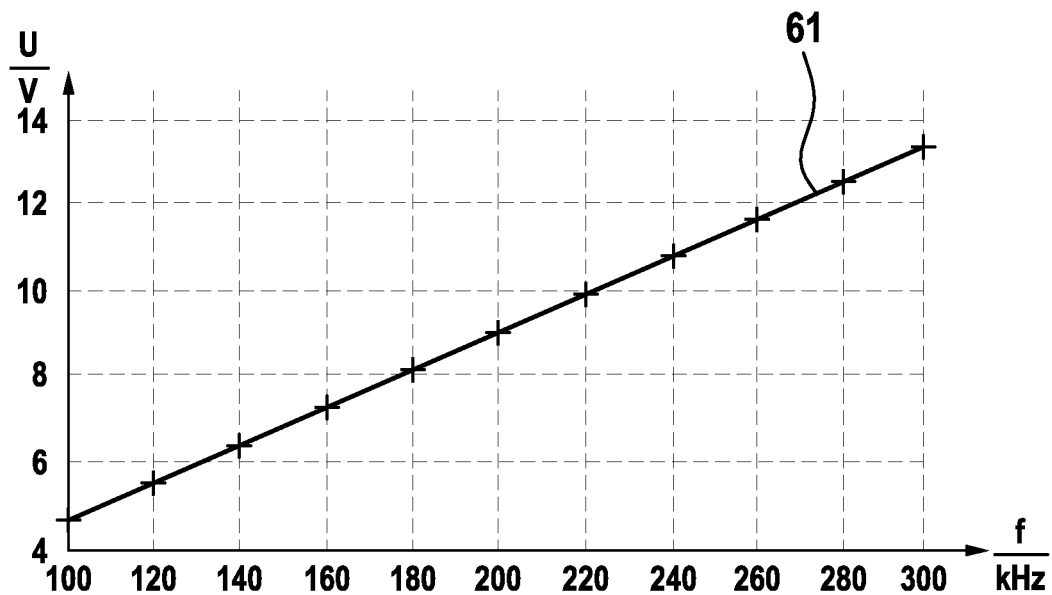
FIG. 3 voltage values of an analog use signal at frequencies of the clock signal of the converter shown in FIG. 1 assigned to different information states.

FIG. 3 shows this relationship between a frequency f of the clock signal 34 and a voltage U of the analog use signal 46. Obviously, there is an almost linear progression which, with an exemplary discretization distance of about 1.1 V, permits transmission of eight information states in orders of magnitude of the clock frequency 34 typical for continuous operation of the power transmission device 14. The linear course is approximated by a compensation line 61, which is given by the function $$U(f)/V=0.0442 \cdot f/kHz+0.176$$

is described. Obviously, the voltage swing between the minimum and maximum switching frequency is approx. 8.8 V.

In the following, further embodiments of the converter 1 are described, whereby identical or similarly acting components are provided with identical reference signs. Unless otherwise described, the preceding explanations also apply to the further embodiment examples.

Figure 4:
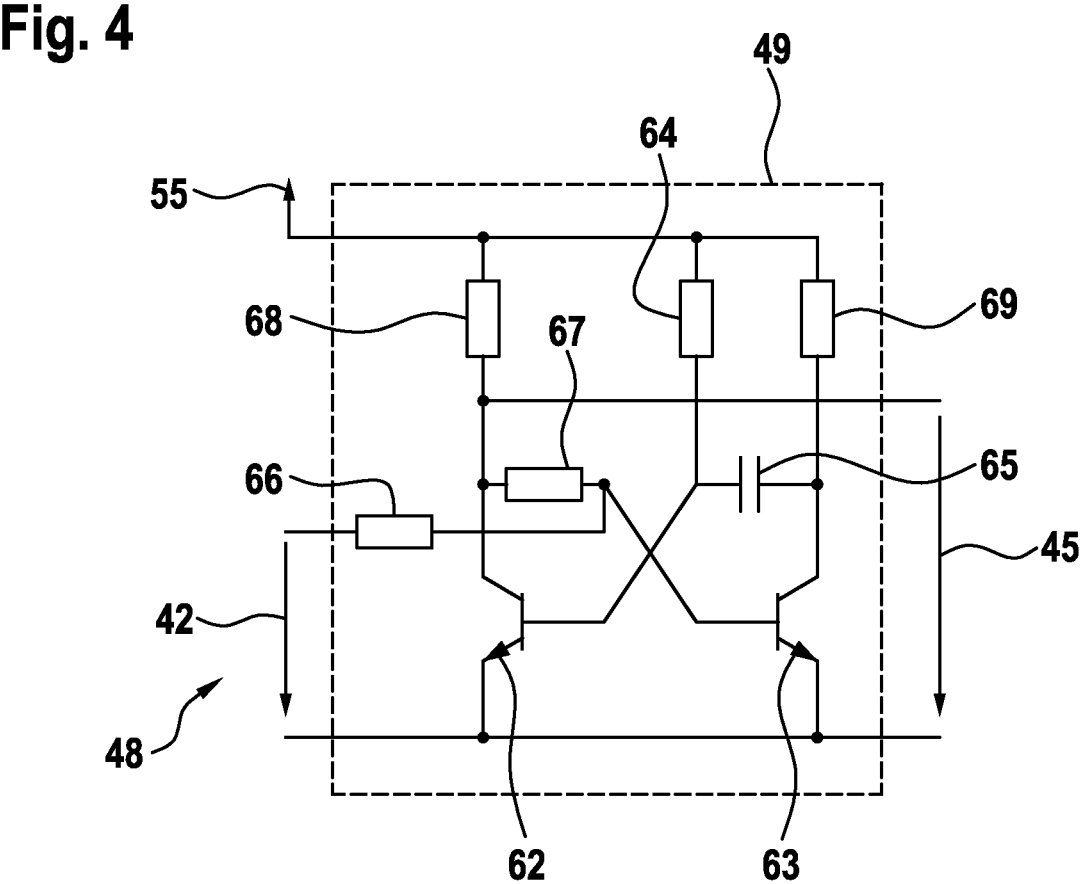
FIG. 4 a circuit diagram of a monoflop unit according to a further embodiment of the converter according to the invention.

FIG. 4 is a circuit diagram of a monoflop unit 49 according to a further embodiment of the converter 1 according to the invention, in which a discrete transistor circuit is used instead of the timer element 50.

For this purpose, the monoflop unit 49 has two transistors 62, 63, which are exemplarily designed here as npn bipolar transistors of the BC547C type. The hold time of the monoflop unit 49 is determined by a resistor 64, and a capacitor 65, which are connected to a control terminal of the transistor 62. Via another resistor 66, the secondary voltage 42 at input 48 is supplied to the control terminal of transistor 63. In addition, further resistors 68, 69, which connect the transistor circuit to the operating voltage 55, and a resistor 67 are provided.

The resistor 64 and the capacitor 65 can be dimensioned according to the formula $$t_{on}=\ln(2) \cdot R \cdot C,$$

the hold time $t_{on}$ can be specified, where R describes the resistance value of resistor 64 and C the capacitance of capacitor 65. For an exemplary configuration of a resistance value of 18 kΩ for resistor 64 and a capacitance value of 220 pF for capacitor 65, this results in a hold time of approximately 2.7 µs. The other resistor values are 10 kΩ (resistors 66, 67) and 1 kΩ (resistors 68, 69).

Figure 5:
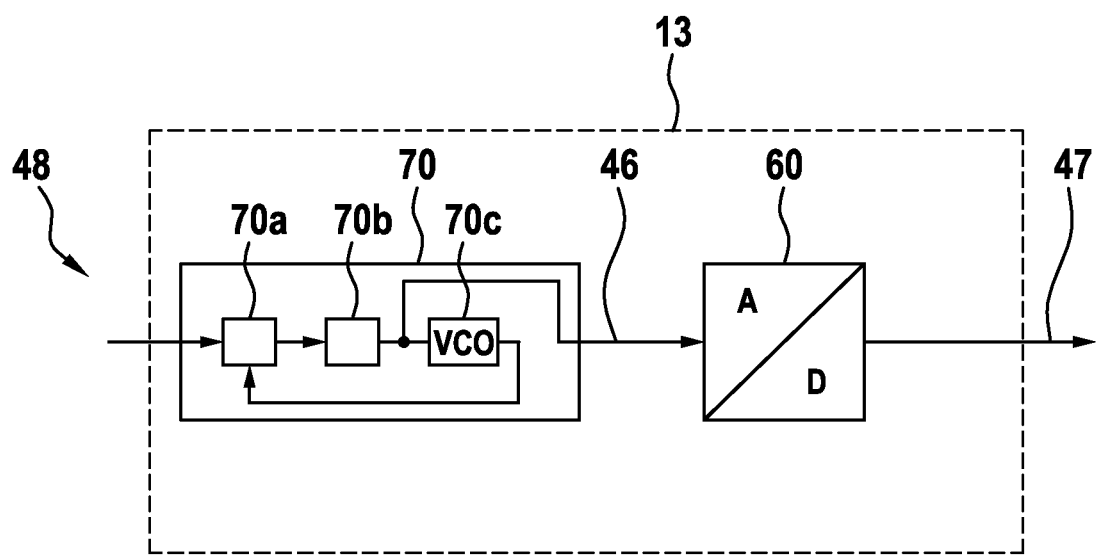
FIGS. 5 to 7 each a block diagram of a demodulation unit according to a further embodiment of the converter according to the invention.

FIG. 5 is a block diagram of a demodulation device 13 according to another embodiment of the power converter 1, wherein a PLL unit 70 is provided instead of the monoflop unit 49 and the low-pass unit 57.

The PLL unit 70 includes a phase comparator 70a, a loop filter 70b, and a voltage-controlled oscillator 70c. The phase comparator receives the secondary voltage 42 at the input 48. An input signal of the voltage-controlled oscillator 70c or an output signal of the loop filter 70b is tapped as an analog use signal 46.

The PLL unit 70 allows a comparatively large range of values or a large number of information states of the auxiliary information 28 to be transmitted, while realizing a shorter transmission time than in the previously described embodiments. As a result, even small frequency changes can lead to a relatively large change in the analog use signal 46, which results in higher sensitivity. Thus, on the one hand, the required frequency variation by the modulation unit 7 (see FIG. 1) can be minimized and, on the other hand, the averaging by the low-pass unit 57 can be omitted. In order to realize the PLL unit 70 with low circuitry effort, it is implemented as a cost- and space-saving integrated circuit.

The analog-to-digital converter unit 60 converts the analog use signal 46 of the PLL unit 70 into the digital use signal 47.

Figure 6:
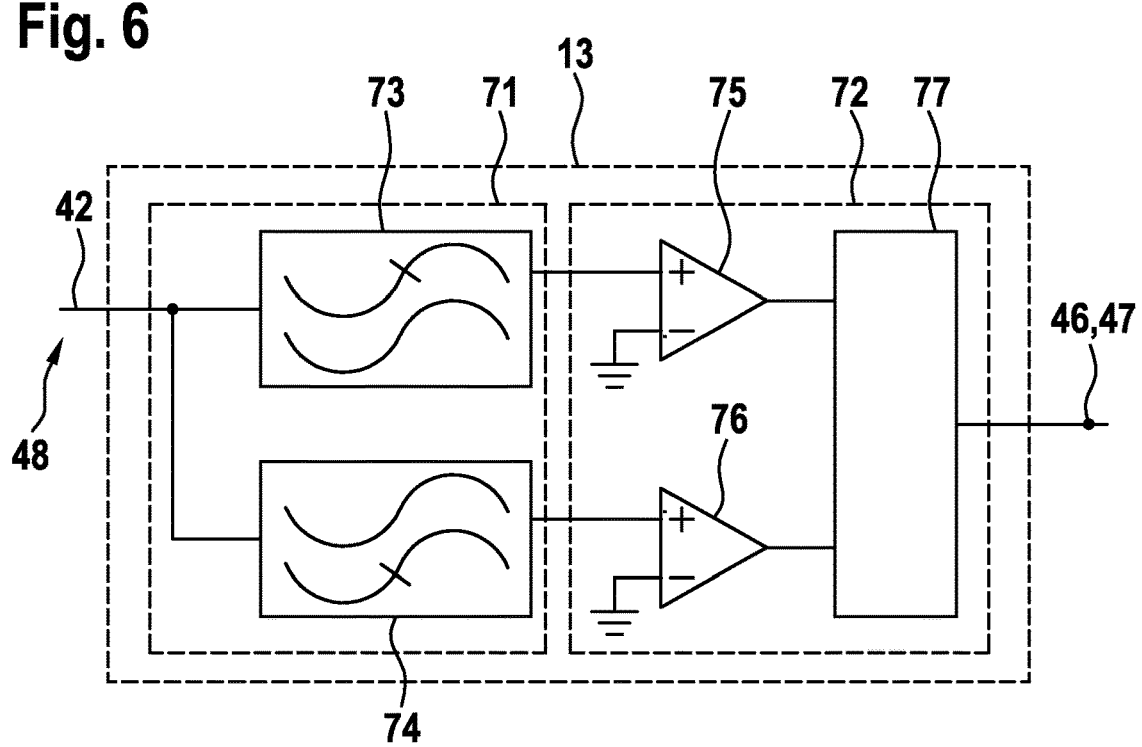

FIG. 6 is a block diagram of a demodulation device 13 according to another embodiment of the power converter 1, which is formed by a filter unit 71 and a decision unit 72.

The filter unit 71 comprises a filter element 73 designed as a low-pass filter and a filter element 74 designed as a high-pass filter. The cut-off frequencies of the filter elements 73, 74 are selected in such a way that they lie between two frequencies of the clock signal 34 assigned in each case to an information state of the auxiliary information 28. The decision unit 72 has a comparator 75, 76 for each filter element 73, which outputs a signal to a selection element 77 in each case when the upstream filter element 73, 74 allows spectral components of the secondary voltage 42 (see FIG. 1) applied to the input 48 to pass. The selection element 77 can either be set up as a multiplexer and provide the digital use signal 47 or be set up as an analog circuit and provide the analog signal 46. The demodulation device 13 shown in FIG. 6 provides a further possibility for demodulating a trivalent auxiliary information 28, which can be realized with little circuitry.

Figure 7:
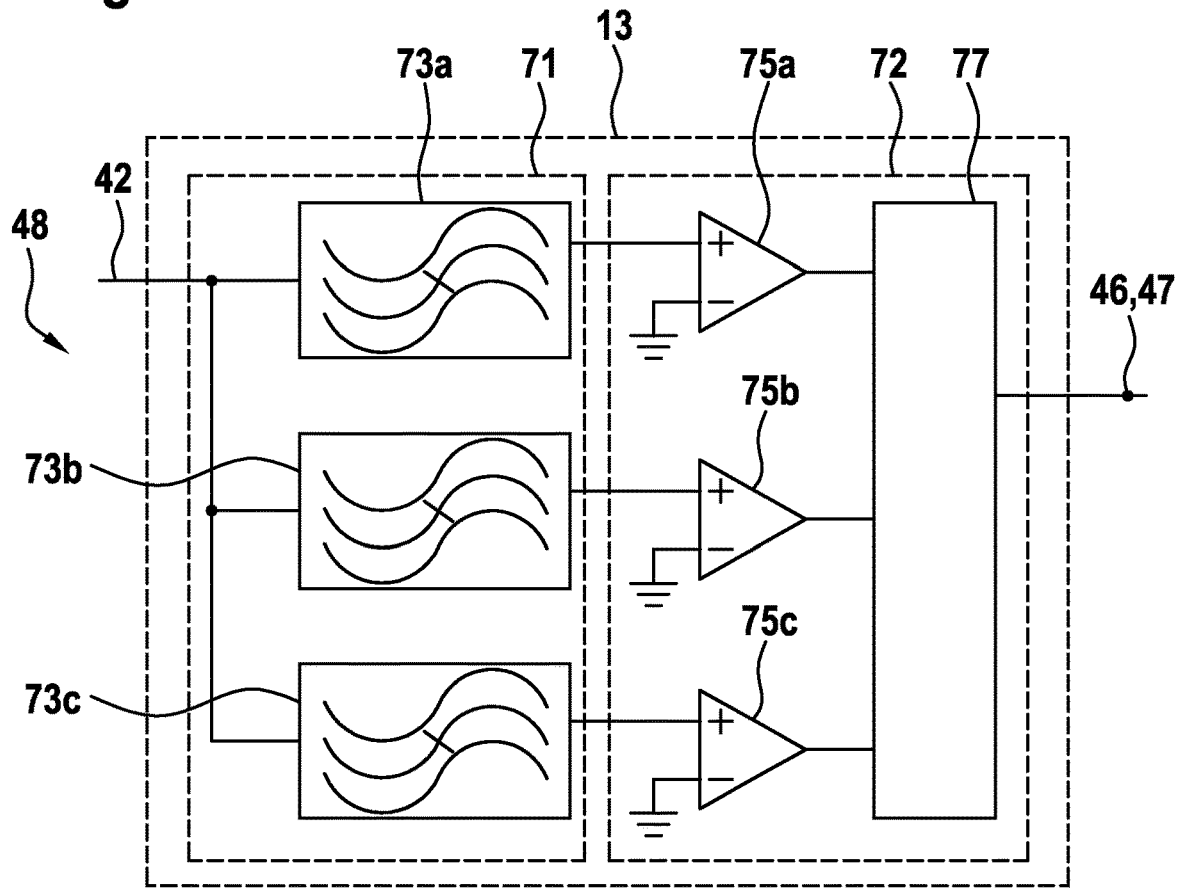

FIG. 7 is a block diagram of a demodulation device 13 according to another embodiment of the power converter 1, which, like the embodiment shown in FIG. 6, comprises a filter unit 71 and a decision unit 72.

The filter unit 71 here comprises three or more filter elements 73a-73c in the form of bandstop filters (notch filters) whose output signal depends on whether the secondary voltage 42 applied to the input 48 lies in a pass band or a stop band. Accordingly, the decision unit 72 has a number of comparators 75a-75c corresponding to the number of filter elements 73a-73c.

Figure 8:
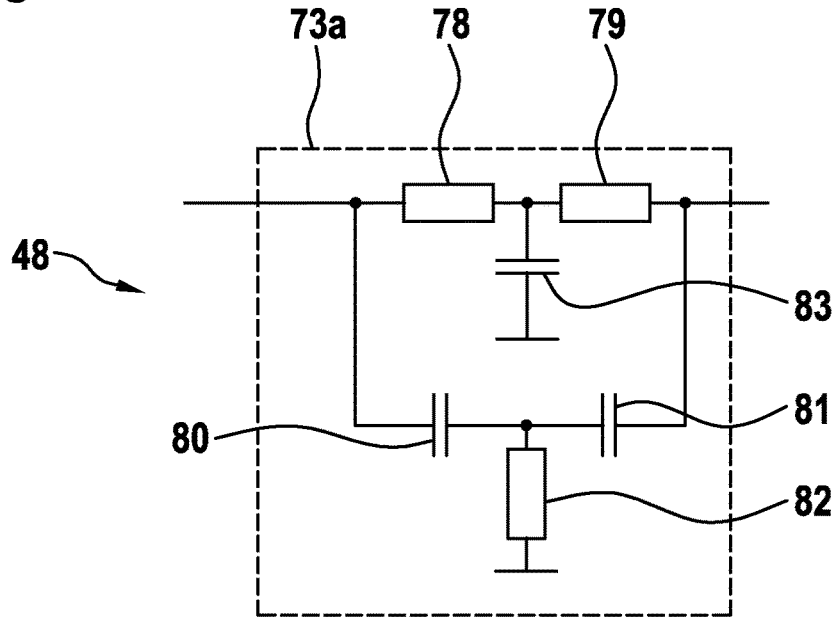
FIG. 8 a circuit diagram of a filter element of the demodulation unit shown in FIG. 7.

FIG. 8 is a circuit diagram of a filter element 73a, which is designed as a passive notch filter.

The filter element 73a has longitudinally connected resistors 78, 79, longitudinally connected capacitors 80, 81, a transversely connected resistor 82 and a transversely connected capacitor 83. To realize a blocking frequency of 300 kHz, the resistor values are selected to be 7.5 kΩ (resistors 78, 79) and 1.8 kΩ (resistor 82) and the capacitance values of capacitors 80, 81, 83 are selected to be 100 pF each.

Figure 9:
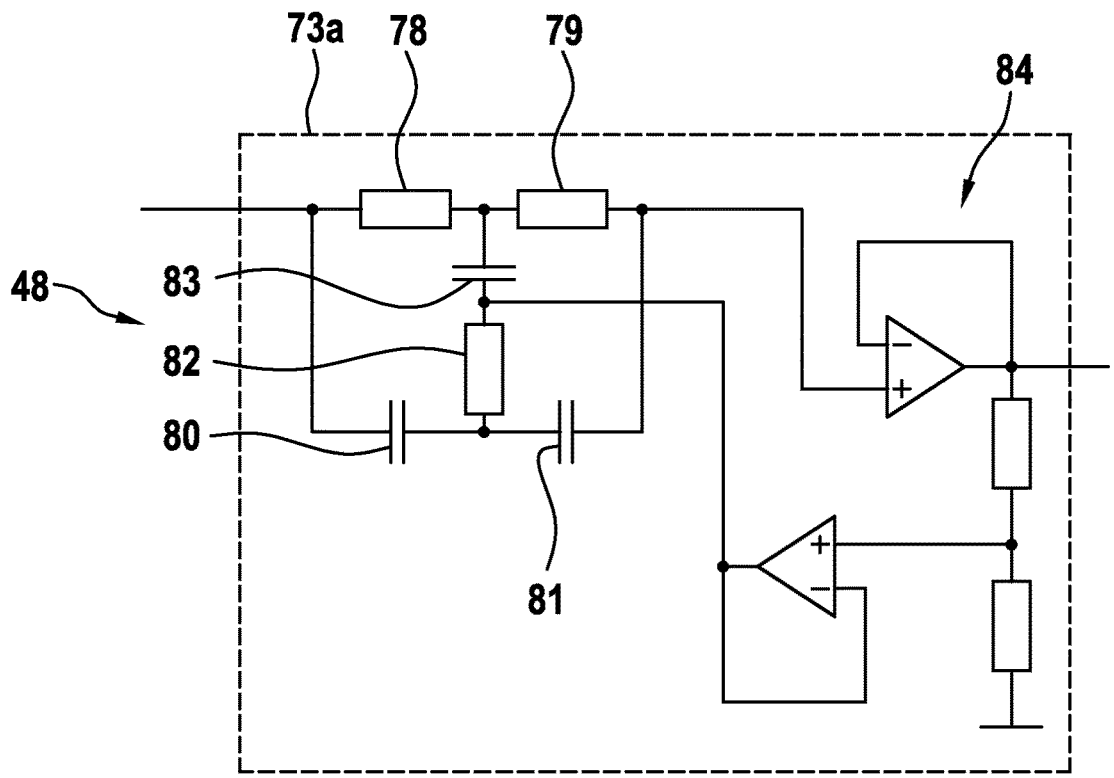
FIG. 9 a circuit diagram of a filter element according to a further embodiment of the converter according to the invention.

FIG. 9 shows a filter unit 73a according to a further embodiment of the converter 1 with the demodulation device 13 shown in FIG. 7. In comparison with FIG. 8, an active notch filter is implemented here, which also has a double-operation amplifier circuit 84. The resistors 78, 79, 82 and the capacitors 80, 81, 83 are dimensioned as described for FIG. 8.

Figure 10:
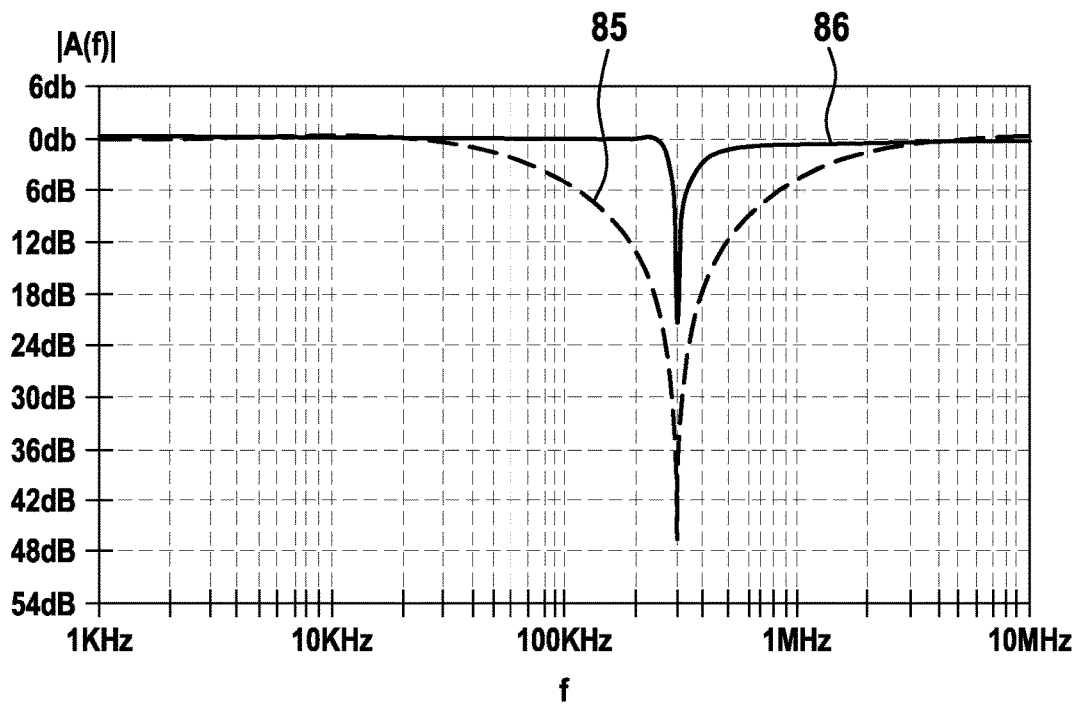
FIG. 10 a magnitude frequency response of the filter elements shown in FIGS. 8 and 9.

FIG. 10 shows a magnitude frequency response 85 of the filter element 73a shown in FIG. 8 and a magnitude frequency response 86 of the filter element 73a shown in FIG. 9, each in a configuration with a stopband frequency of 300 kHz. Obviously, the frequency response 86 realizes a much higher slope or improved frequency selectivity, which enables more reliable detection of the information state of the auxiliary information 28 even when a narrower range of values of frequencies of the clock signal 34 is demodulated.

The filter elements 73b, 73c in FIG. 7 can be implemented analogously to the previously described filter element 73a with dimensions adapted to a different blocking frequency.

According to further embodiment examples, it is also conceivable to combine the filter elements 73, 74 according to FIG. 6 with the filter elements 73a-73c according to FIG. 7, for example to provide the filter element 73 designed as a low-pass filter instead of the filter element 73a for the lowest frequency of the clock signal 34 and/or to provide the filter element 74 designed as a high-pass filter instead of the filter element 73c for the highest frequency of the clock signal 34. According to a further embodiment, the filter elements 73a-73c are bandpass filters. According to a further embodiment, all filter elements 73a-73c are low-pass filters or high-pass filters, wherein the selection element 77 is configured as a 1-out-of-n decoder.

Figure 11:
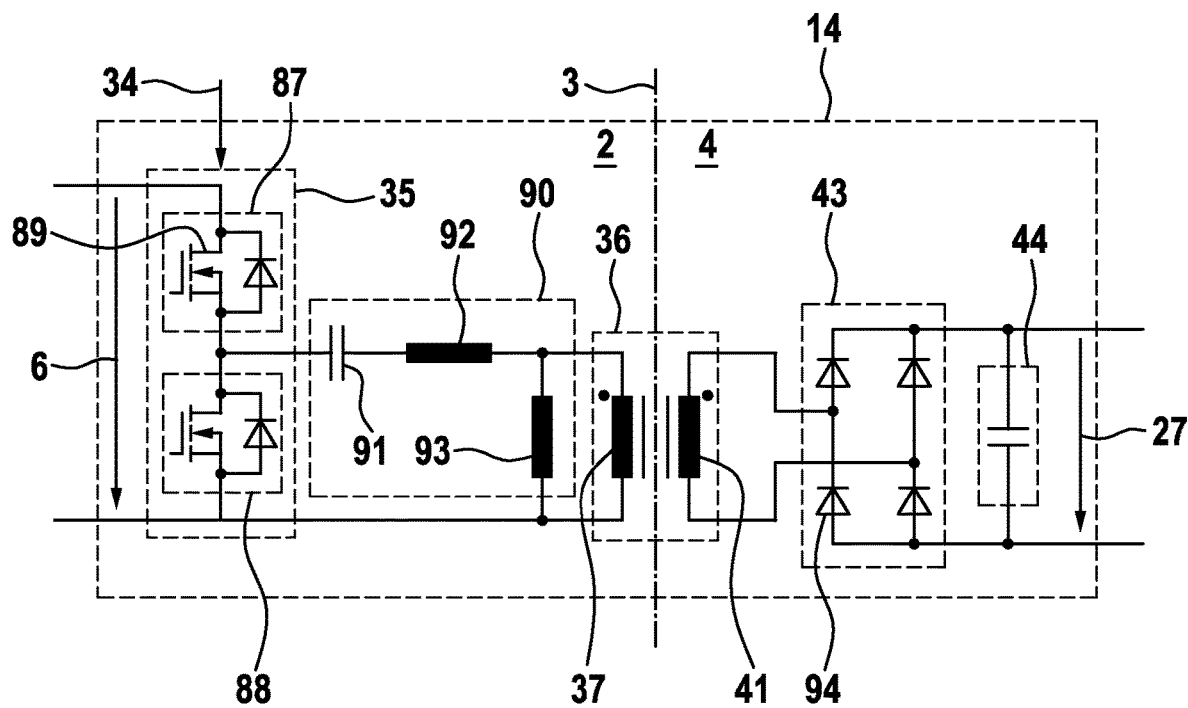
FIG. 11 a circuit diagram of a power transmission device according to a further embodiment of the converter according to the invention.

FIG. 11 is a circuit diagram of a power transfer device 14 according to a further embodiment of the converter 1, wherein the power transfer device 14 is implemented by a last-resonant LLC converter instead of a flyback converter.

The switching unit 35 is formed by a half-bridge of two power switching elements 87, 88, each of which is implemented by a power MOSFET 89 or alternatively by an IGBT or bipolar transistor (BJT) and can be driven by the clock signal 34. In addition, on the primary side 2, the control device 14 has a resonant circuit unit 90 with a series connection of a capacitor 91 and an inductor 92 and a magnetizing inductor 93 connected in parallel with the primary winding 37 of the transmission unit 36. On the secondary side, the rectifier unit 43 is implemented by a bridge rectifier constructed from a plurality of diodes 94.

Figure 12:
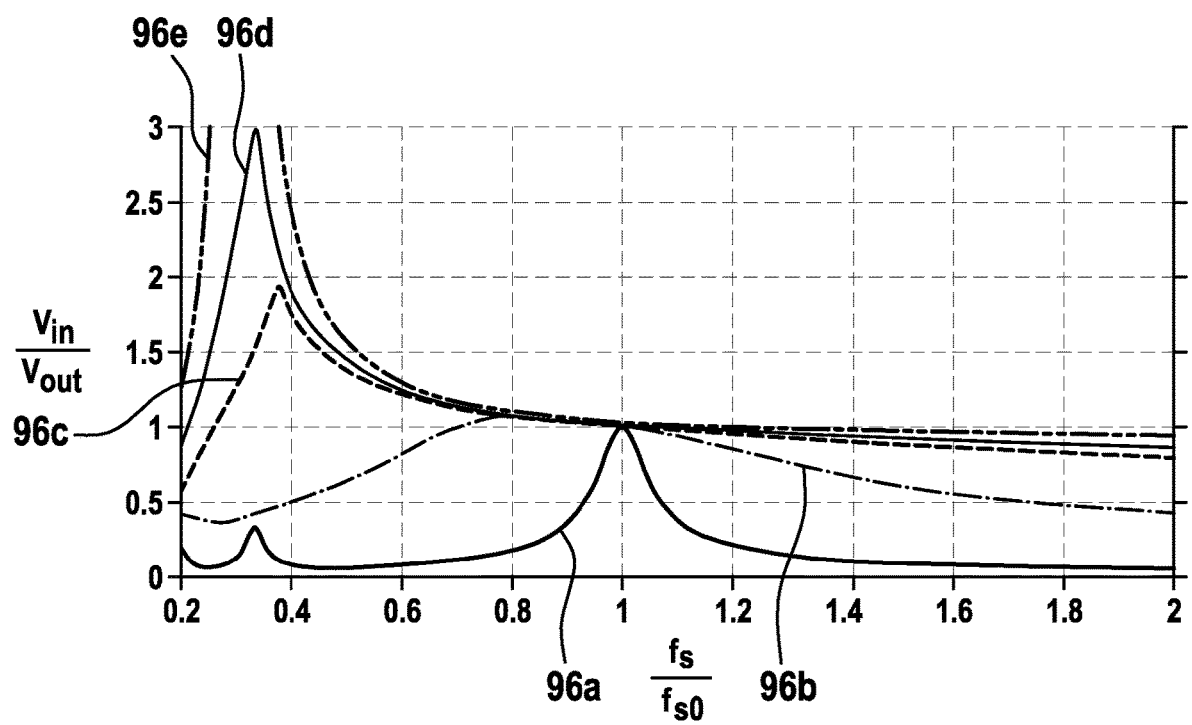
FIG. 12 voltage transformation ratios with respect to input and output voltage over a normalized switching frequency of the power transmission device shown in FIG. 11.

FIG. 12 shows voltage transformation ratios 96a-96e with respect to input and output voltages ($V_{out}/V_{in}$) over a normalized switching frequency ($f_s/f_{s0}$).

Here, the voltage translation ratio with respect to input and output voltage describes the ratio between the supply voltage 6 and the operating voltage 27. The normalized switching frequency describes the ratio of the frequency of the clock signal 34 to the resonant frequency of the series resonant circuit formed by the capacitor 91 and the inductors 92. The voltage transformation ratios 96a-96e relate to different normalized load resistances $Q_L$, which are the ratio of a resistive load of the power transmission device 40 to the characteristic impedance $$Z_L = \sqrt{\frac{L}{C}}$$

where L describes the inductance value of the inductor 92 and C the capacitance value of the capacitor 91. Here, the voltage transformation ratio 96a is based on $Q_L=0.1$, the voltage transformation ratio 96b on $Q_L=1$, the voltage transformation ratio 96c on $Q_L=5$, the voltage transformation ratio 96d on $Q_L=10$, and the voltage transformation ratio 96e on $Q_L \to \infty$.

As can be seen from FIG. 12, the load-resonant power transmission device 14 enables frequency-invariant operation over wide ranges of the normalized switching frequency in the case of sufficiently large normalized load resistances, such as typically occur during operation of the converter 1. Accordingly, the modulation device 7 is arranged to preset the frequency of the clock signal 34 such that it corresponds at least to the resonant frequency of the power transmission device 14. In this way, analogous to the continuous operation of the hard-switching power transmission device 14 according to FIG. 1, a transmission of the auxiliary information 28 can be realized without appreciably affecting the operating voltage 27.

According to another embodiment not shown, instead of the resistor unit 26, the driver device 23 has a drive unit with current source characteristics connected upstream of a control input 25 of a power switching element 20, the current value of which can be varied by the use signal.

Figure 13:
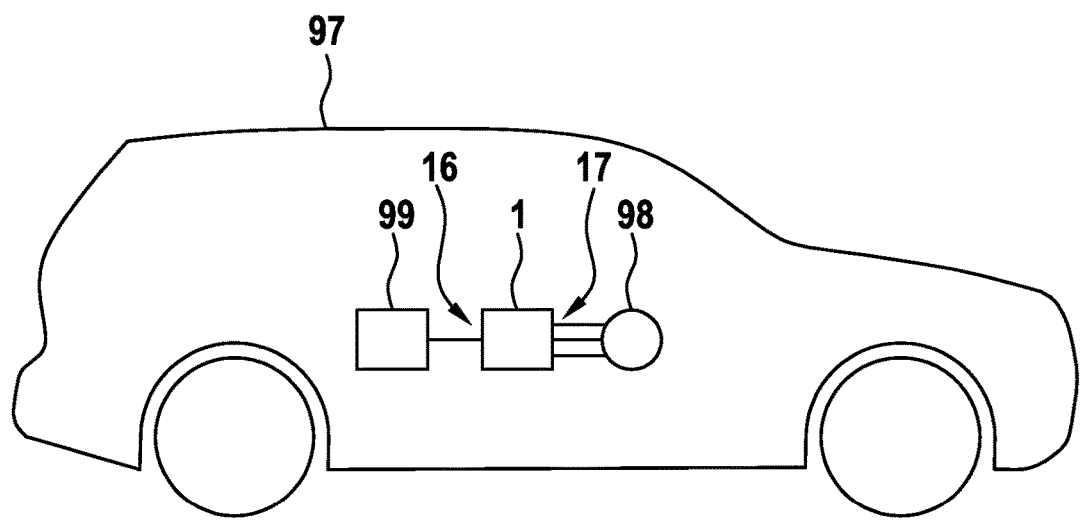
FIG. 13 an embodiment of a vehicle according to the invention.

FIG. 13 is a schematic sketch of an embodiment of a vehicle 97 comprising an electric machine 98 connected to the output 17 of a power converter 1 according to one of the embodiments described above, which is arranged to convert a DC voltage provided by a DC voltage source 99 at the output 16 to supply the electric machine 98. In this example, the vehicle 97 is designed as a land vehicle in the form of a passenger car.

In the previously described embodiments of the power converter 1 or the vehicle 97, the power converter 1 is designed as an inverter. However, the power converter 1 can also be set up as a DC/DC converter, for example for a charging device of the vehicle 97. According to a further embodiment example, the power converter 1 is designed as an active rectifier and the power unit is set up for converting an input AC voltage into an output DC voltage. Such a power converter can also be used, for example, in a charging device of the vehicle 97.

Further, the driver device 23 is exemplarily selected as the functional unit 12. Transmission of auxiliary information 28 via power transmission device 14 may also be provided for any other secondary-side functional unit 12 operable in response to auxiliary information 28 generated on the primary side.

Even if only the digital use signal 47 is used to control the functional unit 12 in each of the previously described embodiment examples, the other use signals 45, 46 can of course also be used to control the functional unit 12 in accordance with further embodiment examples.

The invention claimed is:

1. A power converter having a primary side and a secondary side galvanically isolated therefrom, comprising
    a secondary-side functional unit which is operable in dependence on auxiliary information generated on the primary side,
    a primary-side voltage supply device arranged to provide a supply voltage,
    a power transmission device, which has a switching unit for switching the supply voltage and a transmission unit, which is set up to transmit the switched supply voltage to the secondary side, in order to convert the supply voltage into an operating voltage for the functional unit,
    a primary-side modulation means arranged to provide a clock signal to the switching unit and to vary a frequency of the clock signal in dependence on the auxiliary information, and
    a secondary-side demodulation device which is arranged to generate at least one use signal representing the auxiliary information from a secondary voltage provided by the transmission unit and to provide a use signal to the functional unit,
    wherein the primary-side modulation means is adapted to vary the frequency of the clock signal within a frequency interval in which a voltage translation ratio with respect to input and output voltages of the power transmission device is substantially frequency invariant.

2. The power converter according to claim 1, wherein
    the power transmission device has a hard-switching topology and the modulation device is arranged to provide the clock signal such that the power transmission device is operated in a continuous operating mode, or
    the power transmission device has a load-resonant topology, and the modulation device is arranged to preset the frequency in such a way that it is at least 0.2 times a normalized switching frequency of the power transmission device.

3. The power converter according to claim 1, wherein the demodulation device comprises a monoflop unit whose hold time is less than the shortest period of the clock signal, to which an information state of the auxiliary information is assigned, and which is arranged to provide a pulse-modulated use signal.

4. The power converter according to claim 3, wherein the demodulation device comprises a low-pass unit which is connected downstream of the monoflop unit and is arranged to provide an analog use signal from the pulse-modulated use signal.

5. The power converter according to claim 4, wherein the demodulation device comprises an analog-to-digital converter unit which is set up to convert the analog use signal into a digital use signal.

6. The power converter according to claim 1, wherein the demodulation device comprises a PLL unit which is arranged to provide an analog use signal.

7. The power converter according to claim 1, wherein the demodulation device has a filter unit with at least one filter element, the frequency response of which is selected in such a way that the at least one filter element is operated in a stop band or a pass band at a frequency predetermined by the modulation device, wherein a decision unit providing the use signal is arranged downstream of the filter unit.

8. The power converter according to claim 1, which has a secondary-side power unit with at least one power switching element which can be driven as a function of drive signals generated on the primary side.

9. The power converter according to claim 8, wherein the functional unit is a driver device which is arranged to drive the at least one power switching element in dependence on the drive signals.

10. The power converter according to claim 9, wherein the driver device has at least one resistor unit connected upstream of a control input of a power switching element, a resistance value of said at least one resistor unit can be varied by the use signal, or wherein the driver device has a drive unit with current source characteristic connected upstream of a control input of a power switching element, the current value and/or current profile of said at least one drive unit can be varied by the use signal.

11. The power converter according to claim 8, which has a transmission device which at least partially electrically isolates the primary side and the secondary side and via which the drive signals can be transmitted to the secondary side.

12. The power converter according to claim 8, wherein the power converter is designed as an inverter and the power unit is set up for secondary-side conversion of an input DC voltage into an output AC voltage, or wherein the power converter is designed as a DC/DC converter and the power unit is set up for secondary-side conversion of an input DC voltage into an output DC voltage, or wherein the power converter is designed as an active rectifier and the power unit is set up for conversion of an input AC voltage into an output DC voltage.

13. A vehicle comprising the power converter according to claim 1.

14. A method for operating a converter with a primary side and a secondary side galvanically isolated therefrom, comprising:
provision of a secondary-side functional unit which is operated in dependence on auxiliary information generated on the primary side,
a primary-side voltage supply device which provides a supply voltage, and
a power transmission device, which has a switching unit for switching the supply voltage and a transmission unit, which transmits the switched supply voltage to the secondary side, in order to convert the supply voltage into an operating voltage for the functional unit,
primary-side provision of a clock signal for the switching unit, a frequency of which is changed on the primary side as a function of the auxiliary information, the primary-side provision varying the frequency of the clock signal within a frequency interval in which a voltage translation ratio with respect to input and output voltages of the power transmission device is substantially frequency invariant;
secondary-side generation of at least one use signal representing the auxiliary information from a secondary voltage provided by the transmission unit; and
secondary side providing a use signal to the functional unit.

* * * * *